US011080188B1

(12) United States Patent
Tong et al.

(10) Patent No.: US 11,080,188 B1
(45) Date of Patent: Aug. 3, 2021

(54) METHOD TO ENSURE FORWARD PROGRESS OF A PROCESSOR IN THE PRESENCE OF PERSISTENT EXTERNAL CACHE/TLB MAINTENANCE REQUESTS

(71) Applicant: Apple Inc., Cupertino, CA (US)

(72) Inventors: Jonathan Y. Tong, Austin, TX (US); Ronald P. Hall, Cedar Park, TX (US); Christopher Colletti, Austin, TX (US); David E. Kroesche, Austin, TX (US); James N. Hardage, Jr., Austin, TX (US)

(73) Assignee: Apple Inc., Cupertino, CA (US)

( * ) Notice: Subject to any disclaimer, the term of this patent is extended or adjusted under 35 U.S.C. 154(b) by 272 days.

(21) Appl. No.: 15/939,099

(22) Filed: Mar. 28, 2018

(51) Int. Cl.
| | |
|---|---|
| *G06F 12/0815* | (2016.01) |
| *G06F 12/1036* | (2016.01) |
| *G06F 12/0808* | (2016.01) |
| *G06F 12/1009* | (2016.01) |

(52) U.S. Cl.
CPC ...... *G06F 12/0815* (2013.01); *G06F 12/0808* (2013.01); *G06F 12/1009* (2013.01); *G06F 12/1036* (2013.01); *G06F 2212/683* (2013.01)

(58) Field of Classification Search
None
See application file for complete search history.

(56) References Cited

U.S. PATENT DOCUMENTS

| | | |
|---|---|---|
| 5,905,998 A | 5/1999 | Ebrahim et al. |
| 6,026,461 A | 2/2000 | Baxter et al. |
| 6,516,379 B1 | 2/2003 | Deshpande et al. |
| 6,523,076 B1 | 2/2003 | Kruse |
| 6,542,949 B1 | 4/2003 | Kruse |
| 7,079,485 B1 | 7/2006 | Lau et al. |
| 7,149,829 B2 | 12/2006 | Weber et al. |

(Continued)

OTHER PUBLICATIONS

Shreedhar et al., "Efficient Fair Queueing Using Deficit Round Robin", IEEE/ACM Transactions on Networking, Jun. 1996, pp. 375-385, vol. 4, No. 3, IEEE Press.

(Continued)

*Primary Examiner* — Charles Rones
*Assistant Examiner* — Ryan Dare
(74) *Attorney, Agent, or Firm* — Kowert Hood Munyon Rankin and Goetzel PC; Rory D. Rankin

(57) ABSTRACT

A system and method for efficiently handling maintenance requests among multiple processors. In various embodiments, a given processor of multiple processors receives a maintenance request. If maintenance requests are not currently being blocked, then the given processor determines a type of the maintenance request and updates one or more maintenance type counters based on the type. If one or more counters exceed a threshold, an indication is generated specifying maintenance requests received at a later time are to be held. The received maintenance request is processed. Different types of maintenance requests are used for invalidating entries in the instruction cache, for invalidating entries in a TLB and for synchronizing page table updates. Afterward, software applications continue processing. Forward progress of the software applications is measured using one or more metrics. If forward progress has been achieved, then one or more maintenance type counters are reset.

20 Claims, 8 Drawing Sheets

(56) References Cited

U.S. PATENT DOCUMENTS

| | | |
|---|---|---|
| 7,430,650 B1 | 9/2008 | Ross |
| 7,461,190 B2 | 12/2008 | Subramanian et al. |
| 8,037,250 B1 | 10/2011 | Barreh et al. |
| 8,682,864 B1 | 3/2014 | Plevyak et al. |
| 2001/0010066 A1 | 7/2001 | Chin et al. |
| 2017/0286300 A1* | 10/2017 | Doshi ................ G06F 12/0831 |

OTHER PUBLICATIONS

Chidambaram Nachiappan, et al., U.S. Appl. No. 16/786,581, entitled "Configurable Packet Arbitration With Minimum Progress Guarantees", filed Feb. 10, 2020, 38 pages.

Non-Final Office Action in U.S. Appl. No. 16/786,581, dated Jul. 24, 2020, 13 pages.

\* cited by examiner

METHOD TO ENSURE FORWARD PROGRESS OF A PROCESSOR IN THE PRESENCE OF PERSISTENT EXTERNAL CACHE/TLB MAINTENANCE REQUESTS

BACKGROUND

Technical Field

Embodiments described herein relate to the field of computing systems and, more particularly, to efficiently handling maintenance requests among multiple processors.

Description of the Related Art

Generally speaking, a variety of computing systems include multiple processors and a memory, and the processors generate access requests for instructions and application data while processing software applications. The processors may include a central processing unit (CPU), data parallel processors like graphics processing units (GPUs), digital signal processors (DSPs), multimedia engines, and so forth. Computing systems often include two or three levels of cache hierarchy for the multiple processors. Later levels in the hierarchy of the system memory may include access via a memory controller to dynamic random-access memory (DRAM), dual in-line memory modules (dimms), and a hard disk. Data from recently accessed memory locations are stored within the caches. When the data is requested again, the data may be retrieved from the caches rather than from memory.

Each of the processors utilize linear (or "virtual") addresses when processing the accessed data. A virtual address space for the data and instructions stored in system memory and used by a software process may be divided into pages of a given size. The virtual pages may be mapped to frames of physical memory. Mappings of virtual addresses to physical addresses may keep track of where virtual pages are stored in the physical memory. These mappings are stored in a page table and this page table is stored in memory. A translation look-aside buffer (TLB) stores a subset of the page table.

The TLB may reside between a processor and a given level of the cache hierarchy. Alternatively, a TLB may reside between two levels of the system memory hierarchy. In use, the TLB is accessed with a virtual address of a given memory access request to determine whether the TLB contains an associated physical address for a memory location holding requested data. In some cases, multiple processors share the same page table. When a given processor processes instructions by a software application to modify a subset or all of the mappings in the page table, the given processor sends a maintenance request as a broadcast message to other processors in the computing system. The maintenance request may include an indication that the receiving processors are to invalidate current mappings in a subset or all of a corresponding TLB.

After issuing the maintenance request, the given processor waits for an acknowledgement from the other processors in the computing system before it proceeds to subsequent instructions. Because such activities cause a delay in the processing of instructions, the maintenance requests are typically processed with a relatively high priority by the receiving processors. When processing the maintenance request, a local instruction stream being processed on the receiving processor is blocked while the maintenance request is serviced. In the presence of a persistent stream of maintenance requests, the receiving processor is unable to achieve forward progress on the local instruction stream. Accordingly, an indication of a denial-of-service may be sent to a software application being run on the receiving processor.

In view of the above, efficient methods and mechanisms for efficiently handling maintenance requests among multiple processors are desired.

SUMMARY

Systems and methods for efficiently handling maintenance requests among multiple processors are contemplated. In various embodiments, a computing system includes a memory, multiple processors, and a communication fabric for transferring requests and responses between the multiple processors. The processors are capable of generating maintenance requests for modifying a subset or all of the virtual-to-physical mappings in a given TLB. These maintenance requests are broadcast to each other processor. When a given processor receives a maintenance request via the communication fabric, in some embodiments the given processor determines whether maintenance requests are currently being blocked. If so, the given processor stores the received maintenance request for later processing. For example, a fabric interface unit in the given processor may store the received maintenance request in a queue.

If maintenance requests are not being blocked, then the given processor determines the type of the received maintenance request. For example, different types of maintenance requests are used for invalidating entries in the instruction cache, for invalidating entries in a TLB and for synchronizing page table updates by ensuring no older virtual-to-physical mappings, which are about to be updated, are present in the computing system. After determining the type of the maintenance request, the given processor updates one or more maintenance type counters. If any of the counters exceed a threshold, then an indication is generated specifying maintenance requests are to be held. In such a case, maintenance requests received at a later time are stored in a given queue in the fabric interface unit.

If no counter exceeds a threshold, then no indication is generated specifying maintenance requests are to be held and the received maintenance request is processed. As noted above, the processing of the one or more maintenance requests may stall the processing of software applications. For example, a fetch control unit and a memory management unit may become blocked due to accesses to the instruction cache, an instruction TLB, or a data TLB.

After one or more maintenance requests are processed, one or more software applications continue processing. In various embodiments, an application is any computer program including instructions to perform steps of an algorithm developed by a computer programmer. Examples of applications are user level software applications, kernel mode code, and firmware. Forward progress of the one or more software applications may be measured using one or more metrics such as a number of retired instructions or operations, a number of pending non-cacheable requests, a number of maintenance requests sent out from the given processor, and so on. Examples of non-cacheable requests include requests to update a memory mapped register based on one or more instructions of a software application. If forward progress has not been achieved with the one or more applications, then processing of the one or more applications continues. If forward progress has been achieved, then one or more maintenance type counters are updated. If forward progress is not needed, such as when the given processor transitions to an idle, sleep, or debug state, then one or more maintenance type counters are updated. In an embodiment, one or more maintenance type counters are decremented. In another embodiment, one or more maintenance type counters are reset.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
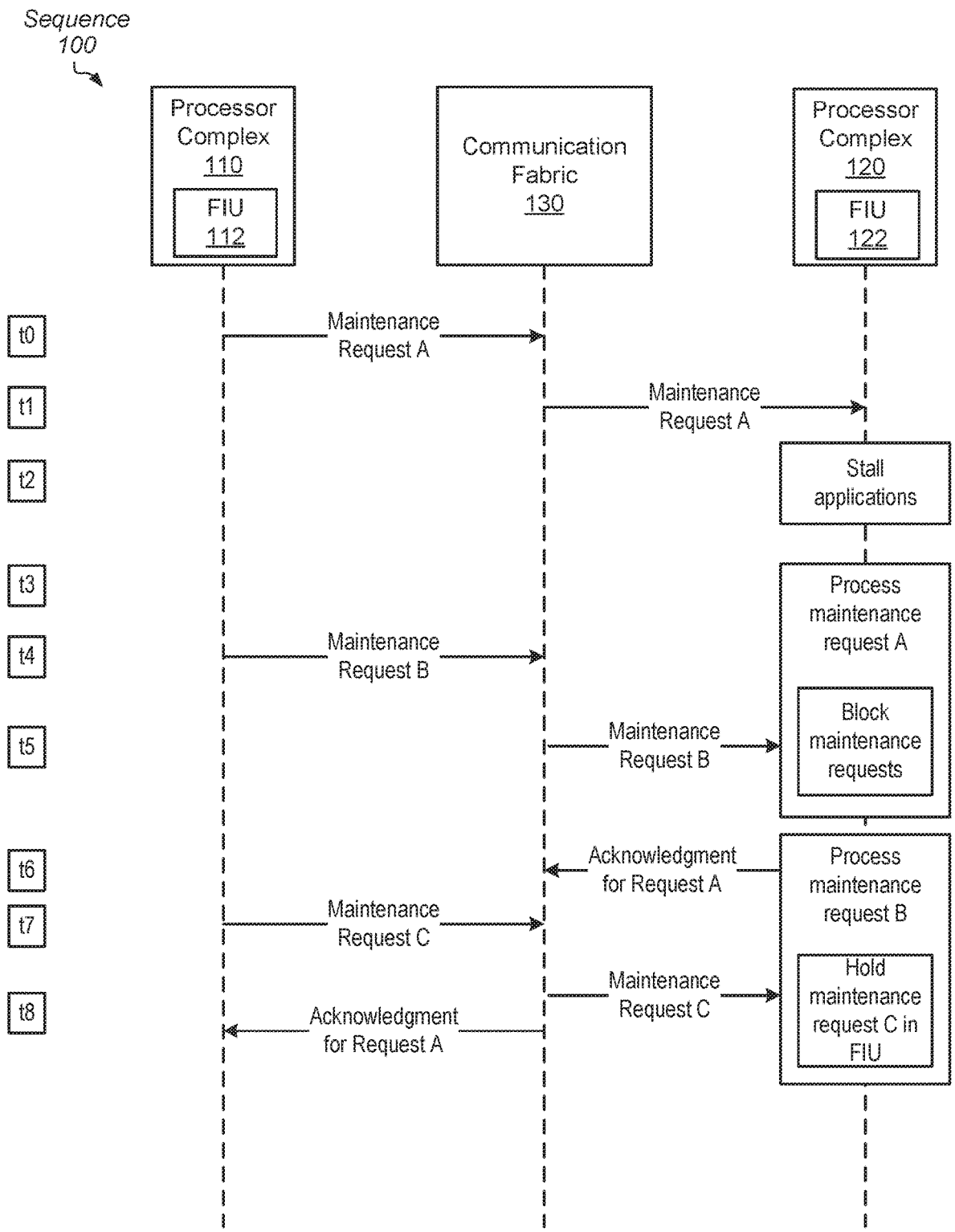
FIG. 1 is a block diagram of one embodiment of a sequence of maintenance requests between processors in a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a sequence 100 of maintenance requests between processors in a computing system is shown. In the illustrated embodiment, two processor complexes 110 and 120 transfer messages and data to one another through a communication fabric 130. Although only two processor complexes are shown, in other embodiments, another number of processor complexes are in the system. The term "processor complex" is used to denote a configuration of one or more processor cores using local storage, such as a shared cache memory subsystem, and capable of processing a workload together.

In various embodiments, different types of traffic flows independently through communication fabric 130. In some embodiments, communication fabric 130 utilizes a single physical fabric bus to include a number of overlaying virtual channels, or dedicated source and destination buffers, each carrying a different type of traffic. Each channel is independently flow controlled with no dependence between transactions in different channels. In other embodiments, communication fabric 130 is packet-based, and may be hierarchical with bridges, cross bar, point-to-point, or other interconnects.

Each of the processor complexes includes a fabric interface unit (FIU). As shown, processor complex 110 includes FIU 112 and processor complex 120 includes FIU 122. In some embodiments, each of FIU 112 and 122 includes queues for storing incoming and outgoing messages in addition to circuitry for transferring messages and data with communication fabric 130 according to a given communication protocol. In an embodiment, the circuitry includes decoder logic for partial pre-decoding or full decoding of received requests.

In various embodiments, each of the multiple processor complexes 110 and 120 utilizes linear addresses (virtual addresses) when retrieving instructions and data while processing one or more software applications. The instructions and data may be retrieved from a local cache memory subsystem, local system memory and/or external memory, which are not shown for ease of illustration. A translation look-aside buffer (TLB), which is not shown, stores a subset of a page table. The page table stores mappings of virtual addresses to physical addresses where virtual pages are loaded in the physical memory. The TLB is accessed with a linear (virtual) address of a given memory access request to determine whether the TLB contains an associated physical address for a memory location holding requested instructions or requested data.

When processor complex 110 processes instructions by a software application to modify a subset or all of the mappings in the page table, the processor complex 110 sends a maintenance request, such as Maintenance Request "A", at time t0 as a broadcast message to processor complex 120 via communication fabric 130. Maintenance Request "A" indicates to receiving processors, such as processor complex 120, to invalidate current mappings in the subset or all of the TLB. As shown, at time t1, communication fabric 130 relays Maintenance Request "A" to processor complex 120. FIU 122 receives Maintenance Request "A."

In some embodiments, FIU 122 performs pre-decoding and determines Maintenance Request "A" is a maintenance request. Afterward, FIU 122 sends the partially decoded Maintenance Request "A" to a given core in processor complex 120. In other embodiments, FIU 122 fully decodes Maintenance Request "A" and determines a type of maintenance request that is Maintenance Request "A." In an embodiment, a first type of maintenance request specifies invalidating a subset or all of the current virtual-to-physical mappings stored in a TLB. The specified TLB may be an instruction TLB (ITLB) or a data TLB (DTLB). A second type of maintenance request specifies invalidating a subset of instructions stored in an instruction cache.

A third type of maintenance request specifies ensuring no older mappings indicated in a previous maintenance request still exists in receiving processor complex 120. For example, in addition to invalidating particular entries in an ITLB, a DTLB or an instruction cache, processor complex 120 ensures pending instructions using the specified older mappings are processed, retired and removed from its pipeline. In another embodiment, processor complex 120 ensures the pending instructions still using the specified older mappings are flushed from its pipeline since the instructions will be restarted with new mappings at a later time.

At time t2, processor complex 120 stalls processing software applications. In one embodiment, the instructions of the software applications become stalled since a fetch unit in processor complex 120 becomes blocked while invalidating entries in the instruction cache or in the ITLB. In another embodiment, the instructions of the software applications become stalled since an execution core or a memory management unit in processor complex 120 becomes blocked while invalidating entries in the DTLB. In yet other embodiments, the instructions of the software applications become stalled since control logic on processor complex 120 intentionally stalls the pipeline registers prior to invaliding entries of the instruction cache, the ITLB or the DTLB.

At time t3, processor complex 120 processes Maintenance Request "A" based on its type. Therefore, processor complex 120 invalidates the specified entries in a specified one of the instruction cache, the ITLB or the DTLB. Alternatively, processor complex 120 performs a memory synchronization step by ensuring no older mappings indicated in a previous maintenance request still exists in processor complex 120. At time t4, processor complex 110 sends another maintenance request indicated by Maintenance Request "B." At time t5, communication fabric 130 sends Maintenance Request "B" to processor complex 120. FIU 122 performs pre-decoding or decoding, and determines Maintenance Request "B" is a maintenance request.

In various embodiments, processor complex 120 includes a counter for each type of maintenance request. When FIU 122 sends a maintenance request to a given core of processor complex 120, one or more counters are updated. In an embodiment, one or more counters are incremented based on the type of the received maintenance request. In some embodiments, each core maintains one or more counters. In other embodiments, processor complex 120 maintains a set of counters corresponding to all of the multiple cores. At time t5, processor complex 120 determines one or more counters exceed a threshold after being updated. Consequently, one or more types of maintenance requests are blocked. Processor complex 120 sends an indication to FIU 122 specifying one or more types of maintenance requests are blocked.

At time t6, processor complex 120 processes Maintenance Request "B" based on its type. In an embodiment, the one or more software applications are still stalled due to the processing of Maintenance Request "A." Additionally, since Maintenance Request "A" has completed, an Acknowledgment for Request A is sent from processor complex 120. At time t7, processor complex 110 sends another maintenance request indicated by Maintenance Request "C." At time t8, communication fabric 130 sends Maintenance Request "C" to processor complex 120. FIU 122 performs pre-decoding or decoding, and determines Maintenance Request "C" is a maintenance request. Due to the earlier received indication to block one or more types of maintenance requests, in an embodiment, FIU 122 holds Maintenance Request "C" until FIU 122 receives an indication to send Maintenance Request "C" to a given core. In various embodiments, FIU 122 stores Maintenance Request "C" in a given queue. Additionally, communication fabric 130 sends Acknowledgment for Request A to processor complex 110.

Figure 2:
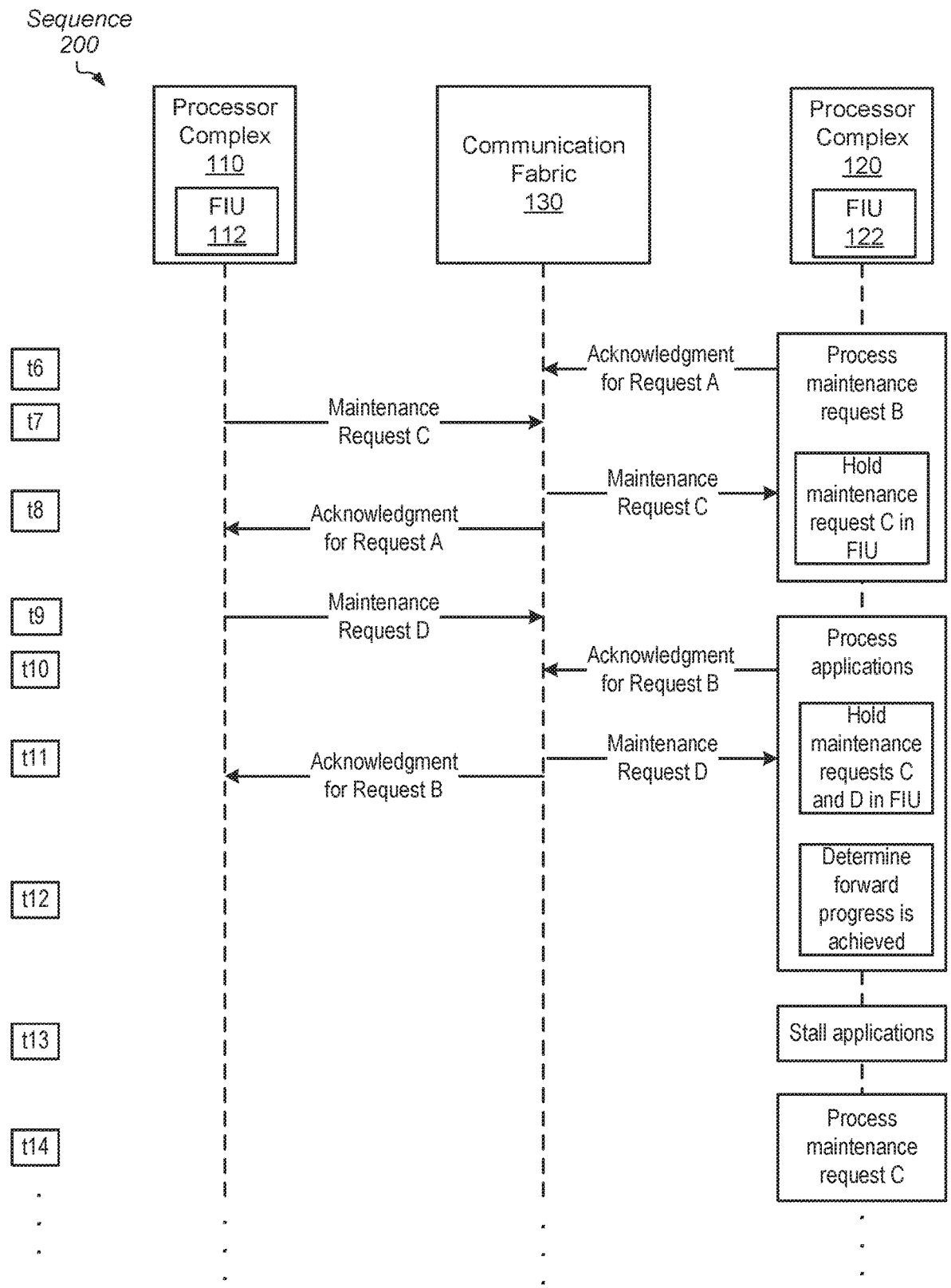
FIG. 2 is a block diagram of one embodiment of a sequence of maintenance requests between processors in a computing system.

Referring to FIG. 2, a generalized a block diagram of another embodiment of a sequence 200 of maintenance requests between processors in a computing system is shown. Circuitry and logic described earlier are numbered identically. In the illustrated embodiment, the sequence of steps from time t6 to time t8 are repeated to illustrate a continuation from sequence 100. Maintenance Request "C" is held by FIU 122 due to the earlier received indication to hold maintenance requests. At time t9, processor complex 110 sends Maintenance Request "D" as a broadcast message to processor complex 120 via communication fabric 130.

At time t10, processor 120 has completed processing Maintenance Request "A" and Maintenance Request "B," and processor complex 120 has begun processing one or more software applications again. One or more page walks may occur due to entries being invalidated in one or more of the ITLB and the DTLB. Additionally, since Maintenance Request "B" has completed, an Acknowledgment for Request B is sent from processor complex 120. At time t11, communication fabric 130 sends Maintenance Request "D" to processor complex 120. FIU 122 performs pre-decoding or full decoding, and determines Maintenance Request "D" is a maintenance request. Due to the earlier received indication to block one or more types of maintenance requests, in some embodiments FIU 122 holds both Maintenance Requests "C" and "D." FIU 122 continues to hold Maintenance Requests "C" and "D" until FIU 122 receives an indication to send one or more of Maintenance Requests "C" and "D" to a given core. In various embodiments, FIU 122 stores Maintenance Request "D" in a given queue as it had done earlier for Maintenance Request "C." Additionally, communication fabric 130 sends Acknowledgment for Request B to processor complex 110.

At time t12, processor complex 120 determines forward progress has been achieved with the processing of the one or more software applications. Forward progress of the one or more software applications may be measured using one or more metrics. In an embodiment, when a given number of instructions (or micro-operations) of the one or more software applications have retired, processor complex 120 determines forward progress has been achieved.

In another embodiment, when a given number of pending non-cacheable requests have been sent, processor complex 120 determines forward progress has been achieved. Examples of non-cacheable requests are requests transferring information with one or more power managers across the computing system. Other examples of non-cacheable requests are requests to update a memory mapped register based on one or more instructions of a software application. In one example, a computing system utilizing processor complexes 110 and 120 interfaces with a heart rate monitor, a thermometer or other device. A request for data, such as a programmed input/output (PIO) request, is sent. In various embodiments, the response is received via communication fabric 130 by the given one of processor complexes 110 and 120 that sent the request. In some embodiments, the responses for the non-cacheable requests use a same channel as the maintenance requests. If that same channel is blocked, then the responses for the non-cacheable requests may be queued behind the blocked maintenance requests, resulting in a dead-lock situation. However, by determining the given number of pending non-cacheable requests have been sent, forward progress may be determined to be achieved. Therefore, in an embodiment, the channel will no longer be blocked.

In yet another embodiment, when a given number of maintenance requests have been sent, processor complex 120 determines forward progress has been achieved. In various embodiments, if processor complex 120 determines forward progress has been achieved, then one or more maintenance type counters are updated. In an embodiment, one or more maintenance type counters are decremented. In another embodiment, one or more maintenance type counters are reset.

At time t13, processor complex 120 stalls processing software applications. As described earlier, in one embodiment, the instructions of the software applications become stalled since the fetch unit or the memory management unit in processor complex 120 becomes blocked while invalidating entries in the instruction cache, the ITLB or the DTLB. In yet other embodiments, the instructions of the software applications become stalled since control logic on processor complex 120 intentionally stalls the pipeline registers prior to invaliding entries of the instruction cache, the ITLB or the DTLB.

At time t14, processor complex 120 processes Maintenance Request "C" based on its type. Therefore, processor complex 120 invalidates the specified entries in a specified one of the instruction cache, the ITLB or the DTLB. Alternatively, processor complex 120 performs a memory synchronization step by ensuring no older mappings indicated in a previous maintenance request still exists in processor complex 120. When processor complex 120 completes processing Maintenance Request "C," a corresponding acknowledgment is sent from processor complex 120 to processor complex 110 via communication fabric 130. Similarly, an acknowledgment is sent from processor complex 120 when Maintenance Request "D" is completed.

Figure 3:
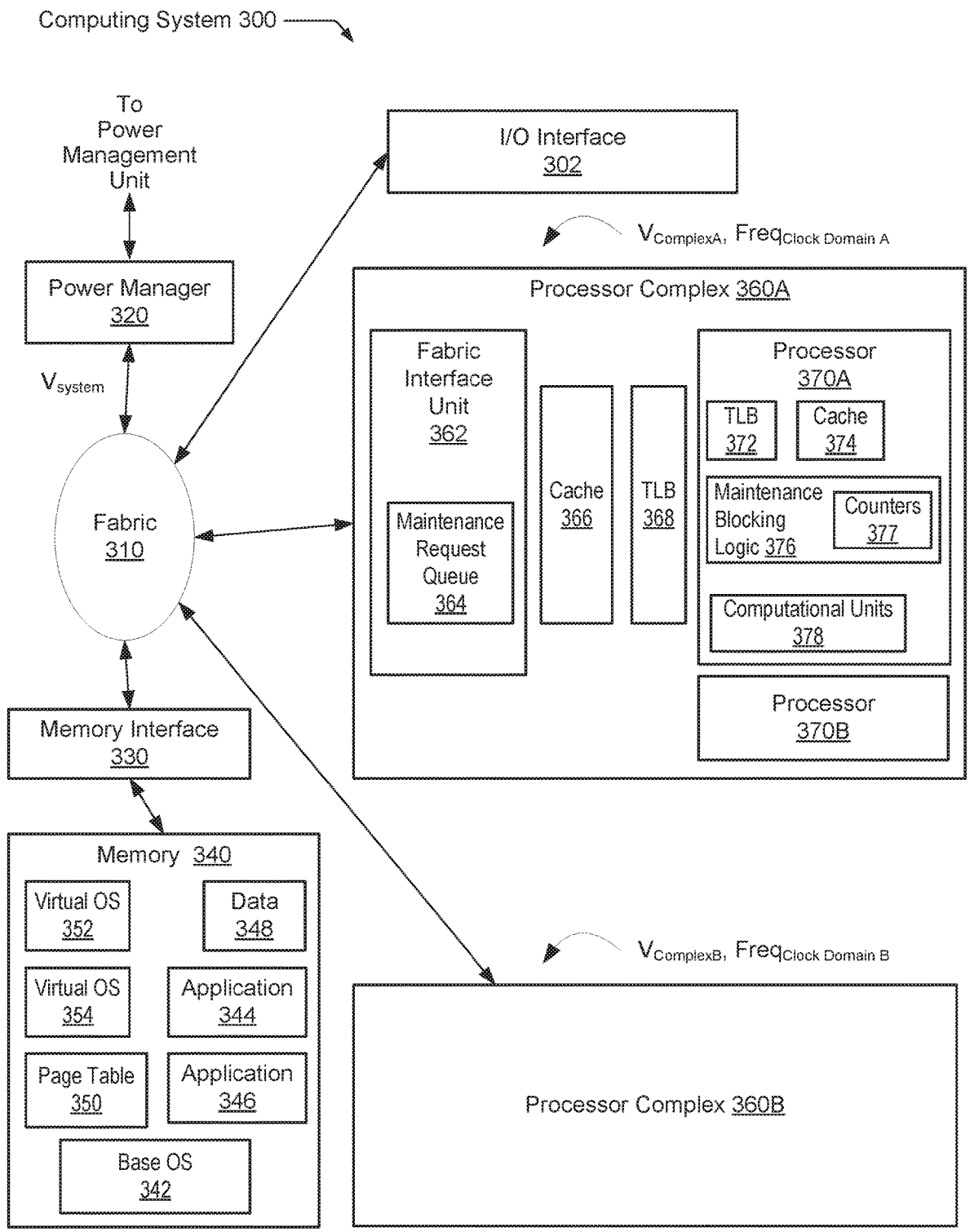
FIG. 3 is a block diagram of one embodiment of a computing system.

Turning now to FIG. 3, a generalized block diagram of one embodiment of a computing system 300 capable of efficiently handling maintenance requests among processors in a computing system is shown. As shown, a communication fabric 310 routes traffic between the input/output (I/O) interface 302, the memory interface 330, the power manager 320 and the processor complexes 360A-360B. In various embodiments, the computing system 300 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, and so forth are not shown in FIG. 3 for ease of illustration. It is also noted that the number of components of the computing system 300 (and the number of subcomponents for those shown in FIG. 3, such as within each of the processor complexes 360A-360B) may vary from embodiment to embodiment. There may be more or fewer of each component/subcomponent than the number shown for the computing system 300. As described earlier, the term "processor complex" is used to denote a configuration of one or more processor cores using local storage, such as a shared cache memory subsystem, and capable of processing a workload together.

The power manager 320 controls the supply voltage magnitudes requested from the external power management unit. There may be multiple supply voltages generated by the external power management unit for the computing system 300. For example, in the illustrated embodiment is a supply voltage indicated as $V_{Complex}$ for each of the processor complexes 360A-360B and a supply voltage $V_{System}$ for one or more other components in the computing system 300. There may be multiple supply voltages for the rest of the computing system 300, in some embodiments.

In some embodiments, logic local to various components may control the power states of the components, including power up and power down and various other power-performance states (P-states) and operating modes for those components that support more than one P-state and operating mode. In various embodiments, the P-state is used to determine the operational voltage and operational frequency used by a component, whereas the operating mode determines how many sub-components are powered up such as particular execution pipelines.

In various embodiments, each of the processor complexes 360A-360B operates with a different supply voltage from different power planes (e.g., $V_{ComplexA} \neq V_{ComplexB}$). As shown, the processor complex 360A uses the voltage magnitude $V_{complexA}$ as an operational supply voltage and the clock frequency $F_{Clock}$ Domain A from a first clock domain. The processor complex 360B uses the voltage magnitude $V_{ComplexB}$ as an operational supply voltage and the clock frequency $F_{Clock}$ Domain B from a different, second clock domain. In other embodiments, each of the processor complexes 360A-360B operates with a same supply voltage (e.g., $V_{ComplexA} = V_{ComplexB}$) from a single power plane while also operating with different clock frequencies source from different clock domains.

In various embodiments, different types of traffic flows independently through the fabric 310. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 310 may also be packet-based, and may be hierarchical with bridges, cross bar, point-to-point, or other interconnects.

In some embodiments, the memory interface 330 uses at least one memory controller and at least one cache for the off-chip memory, such as synchronous DRAM (SDRAM). The memory interface 330 stores memory requests in request queues, uses any number of memory ports, and uses circuitry capable of interfacing to memory using one or more of a variety of protocols used to interface with memory channels used to interface to memory devices (not shown). The memory interface 330 may be responsible for the timing of the signals, for proper clocking to synchronous dynamic random access memory (SDRAM), on-die flash memory, etc.

In various embodiments, one or more of the memory interface 330, an interrupt controller (not shown), and the fabric 310 uses control logic to ensure coherence among the different processor complexes 360A-360B and peripheral devices. In some embodiments, this circuitry uses cache coherency logic employing a cache coherency protocol to ensure data accessed by each source is kept up to date. An example of a cache coherency protocol includes the MOESI protocol with the Modified (M), Owned (O), Exclusive (E), Shared (S), and Invalid (I) states.

Although a single memory 340 is shown, computing system 300 may include multiple memory components arranged in a memory hierarchy. For example, memory 340 may include one or more of a shared last-level cache if it is not included in the memory interface 330, an SDRAM or other type of RAM, on-die flash memory, and so forth. As shown, memory 340 stores one or more applications such as applications 344-346. In an example, a copy of at least a portion of application 344 is loaded into an instruction cache in one of the processors 370A-370B when application 344 is selected by the base operating system (OS) 342 for execution. Alternatively, one of the virtual (guest) OSes 352 and 354 selects application 344 for execution.

Memory 340 stores a copy of the base OS 342 and copies of portions of base OS 342 are executed by one or more of the processors 370A-370B. Data 348 may represent source data for applications in addition to result data and intermediate data generated during the execution of applications. A virtual address space for the data stored in memory 340 and used by a software process is typically divided into pages of a prefixed size. The virtual pages are mapped to frames of physical memory. The mappings of virtual addresses to physical addresses where virtual pages are loaded in the physical memory are stored in page table 350. Each of translation look-aside buffers (TLBs) 368 and 372 stores a subset of page table 350.

In some embodiments, the components 362-378 of the processor complex 360A are similar to the components in the processor complex 360B. In other embodiments, the components in the processor complex 360B are designed for lower power consumption, and therefore, include control logic and processing capability producing less performance. For example, supported clock frequencies may be less than supported clock frequencies in the processor complex 360A. In addition, one or more of the processors in processor complex 360B may include a smaller number of execution pipelines and/or functional blocks for processing relatively high power consuming instructions than what is supported by the processors 370A-370B in the processor complex 360A.

As shown, processor complex 360A uses a fabric interface unit (FIU) 362 for providing memory access requests and responses to at least the processors 370A-370B. Processor complex 360A also supports a cache memory subsystem which includes at least cache 366. In some embodiments, the cache 366 is a shared off-die level two (L2) cache for the processors 370A-370B although an L3 cache is also possible and contemplated.

In some embodiments, the processors 370A-370B use a homogeneous architecture. For example, each of the processors 370A-370B is a general-purpose processor, such as a central processing unit (CPU), which utilizes circuitry for executing instructions according to a predefined general-purpose instruction set. Any of a variety of instruction set architectures (ISAs) may be selected. In some embodiments, each core within processors 370A-370B supports the out-of-order execution of one or more threads of a software process and include a multi-stage pipeline. The processors 370A-370B may support the execution of a variety of operating systems.

In other embodiments, the processors 370A-370B use a heterogeneous architecture. In such embodiments, one or more of the processors 370A-370B is a highly parallel data architected processor, rather than a CPU. In some embodiments, these other processors of the processors 370A-370B use single instruction multiple data (SIMD) cores. Examples of SIMD cores are graphics processing units (GPUs), digital signal processing (DSP) cores, or otherwise.

In various embodiments, each one of the processors 370A-370B uses one or more cores and one or more levels of a cache memory subsystem. The processors 370A-370B use multiple one or more on-die levels (L1, L2, L3 and so forth) of caches for accessing data and instructions. If a requested block is not found in the on-die caches or in the off-die cache 366, then a read request for the missing block is generated and transmitted to the memory interface 330 via fabric 310. When one of applications 344-346 is selected for execution by processor complex 360A, a copy of the selected application is retrieved from memory 340 and stored in cache 366 of processor complex 360A. In various embodiments, each of processor complexes 360A-360B utilizes linear addresses (virtual addresses) when retrieving instructions and data from caches 374 and 366 while processing applications 344-346.

Each of the processors 370A-370B is capable of generating maintenance requests for modifying a subset or all of the virtual-to-physical mappings in one or more of TLBs 368 and 372. These maintenance requests are broadcast to each other processor. When processing complex 360A receives a maintenance request via fabric 310, in an embodiment, FIU 362 determines whether maintenance requests are currently being blocked. If so, FIU 362 stores the received maintenance request in the maintenance request queue 364.

If maintenance requests are not being blocked, then in an embodiment, FIU 362 performs pre-decoding of the received maintenance request to determine it is a maintenance request. Afterward, FIU 362 sends the maintenance request to processor 370A, in one example. One or more of the maintenance block logic 376 and a decode unit among the computation units 378 determines the type of the maintenance request. For example, different types of maintenance requests are used for invalidating entries in the instruction cache, for invalidating entries in a TLB and for synchronizing page table updates by ensuring no older virtual-to-physical mappings are present in computing system 300.

After determining the type of the maintenance request, one or more maintenance type counters 377 are updated. In some embodiments, a counter of counters 377 corresponding to the determined type is incremented. In other embodiments, a counter of counters 377 corresponding to a total of maintenance requests is also incremented. In some embodiments, if any of the maintenance type counters 377 exceeds a threshold, then an indication is generated specifying maintenance requests are to be held. The indication is sent to FIU 362. Therefore, maintenance requests received at a later time are stored in the maintenance request queue 364 in FIU 362.

If no counter of maintenance type counters 377 exceeds a threshold, then no indication is generated specifying maintenance requests are to be held. The received maintenance request is processed by sending it to computation units 378. The processing of the one or more maintenance requests may stall the processing of one or more of software applications 344-346. For example, a fetch control unit and a memory management unit within computation units 378 may become blocked due to accesses to the instruction cache, the instruction translation lookaside buffer (TLB) or the data TLB.

After one or more maintenance requests are processed, one or more of software applications 344-346 continue processing on computation units 378. Forward progress of the one or more software applications may be measured using a given number of retired operations, a given number of pending non-cacheable requests sent out and a given number of maintenance requests sent out from the given processor. If forward progress has not been achieved, then processing of one or more of software applications 344-346 continues. If forward progress has been achieved, then one or more of maintenance type counters 377 are updated. If forward progress has not been achieved due to processor 370A transitioning into a lower-power P-state, such as a sleep state, then one or more of maintenance type counters 377 are updated. In an embodiment, one or more of maintenance type counters are decremented in these cases. In another embodiment, one or more of maintenance type counters are reset in these cases. When one or more of maintenance type counters 377 return to being below a corresponding threshold, an indication specifying to block maintenance requests is cleared and FIU 362 sends any pending maintenance requests stored in maintenance request queue 364 to one or more of processors 370A-370B.

Figure 4:
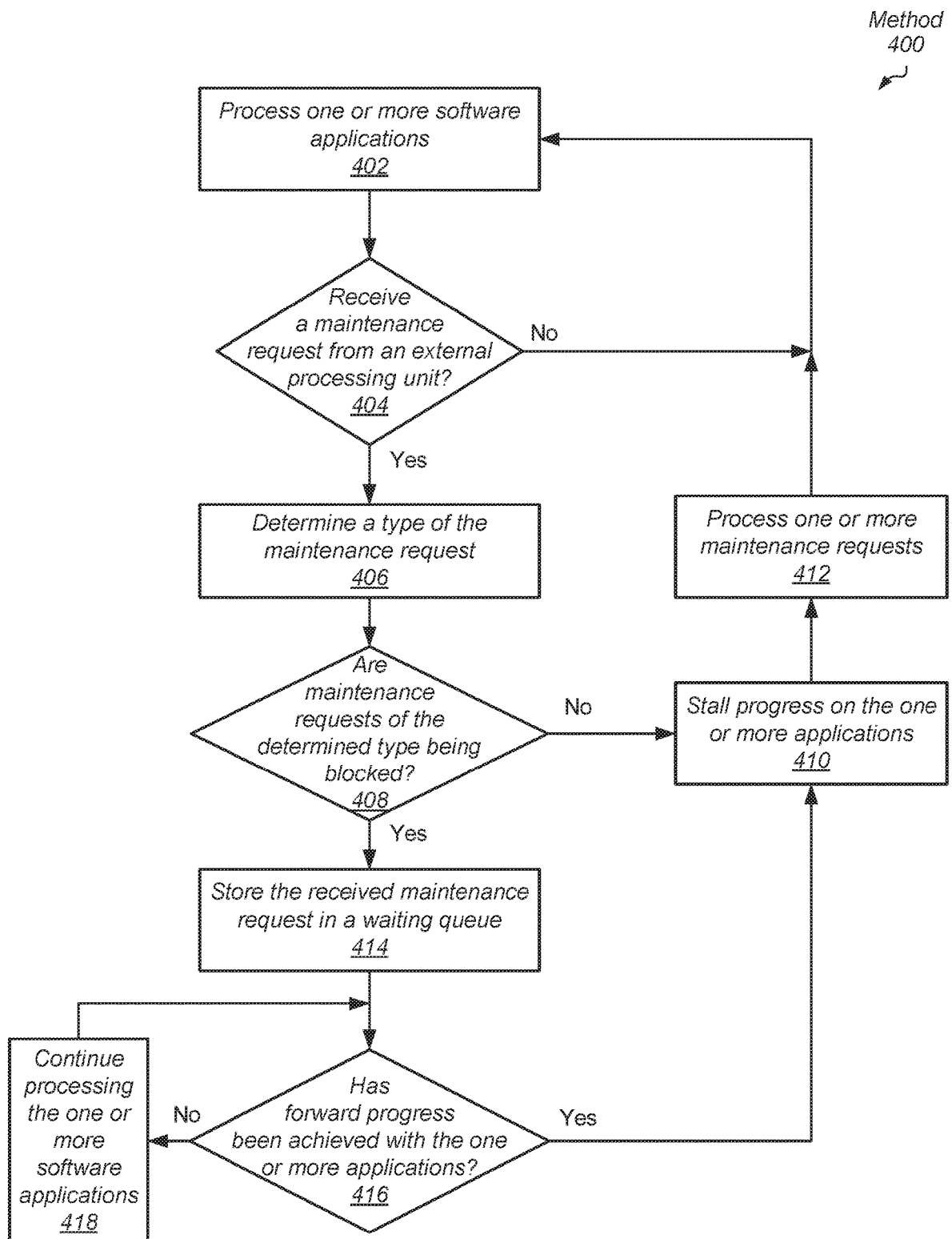
FIG. 4 is a flow diagram of one embodiment of a method for handling maintenance requests among processors in a computing system.

Referring now to FIG. 4, a generalized flow diagram of one embodiment of a method 400 for handling maintenance requests among processors in a computing system is shown. For purposes of discussion, the steps in this embodiment (as well as for FIGS. 5-6) are shown in sequential order. However, in other embodiments some steps may occur in a different order than shown, some steps may be performed concurrently, some steps may be combined with other steps, and some steps may be absent.

In block 402, program instructions are processed. The instructions may be compiled, fetched from memory, decoded and executed. If a maintenance request from an external processing unit is received ("yes" branch of the conditional block 404), then a type of the maintenance request is determined (block 406). Different types of maintenance requests are used for invalidating entries in the instruction cache, for invalidating entries in a TLB, and for synchronizing page table updates by ensuring no older virtual-to-physical mappings about to be updated are present in the computing system.

If maintenance requests of the determined type are not being blocked ("no" branch of the conditional block 408), then progress on the one or more applications is expressly stalled (e.g., via a signal or otherwise) (block 410) and one or more maintenance requests are processed (block 412). Alternatively, block 410 may not be present and the one or more applications become stalled as a result of processing of maintenance requests in block 412 due to accesses to an instruction cache or a TLB.

If maintenance requests of the determined type are being blocked ("yes" branch of the conditional block 408), then the received maintenance request is stored in a queue (block 414). Forward progress of the one or more software applications may be measured using one or more metrics such as a given number of retired operations, a given number of pending non-cacheable requests sent out and a given number of maintenance requests sent out from the given processor. Examples of non-cacheable requests include requests to update a memory mapped register based on one or more instructions of a software application. In one example, a computing system utilizing multiple processor complexes interfaces with a heart rate monitor, a thermometer or other device. A request for data, such as a programmed input/output (PIO) request, is sent. In various embodiments, the response is received via communication fabric by a given one of processor complexes that sent the request. However, by sending the request, forward progress may be determined to be achieved. Transferring information with one or more power managers across the computing system may be another example of non-cacheable requests being sent.

If forward progress has been achieved with the one or more applications ("yes" branch of the conditional block 416), then control flow of method 400 moves to block 410 where progress on the one or more applications is stalled and one or more maintenance requests are processed (block 412). If forward progress has not been achieved with the one or more applications ("no" branch of the conditional block 416), then the one or more software applications continue processing (block 418).

Figure 5:
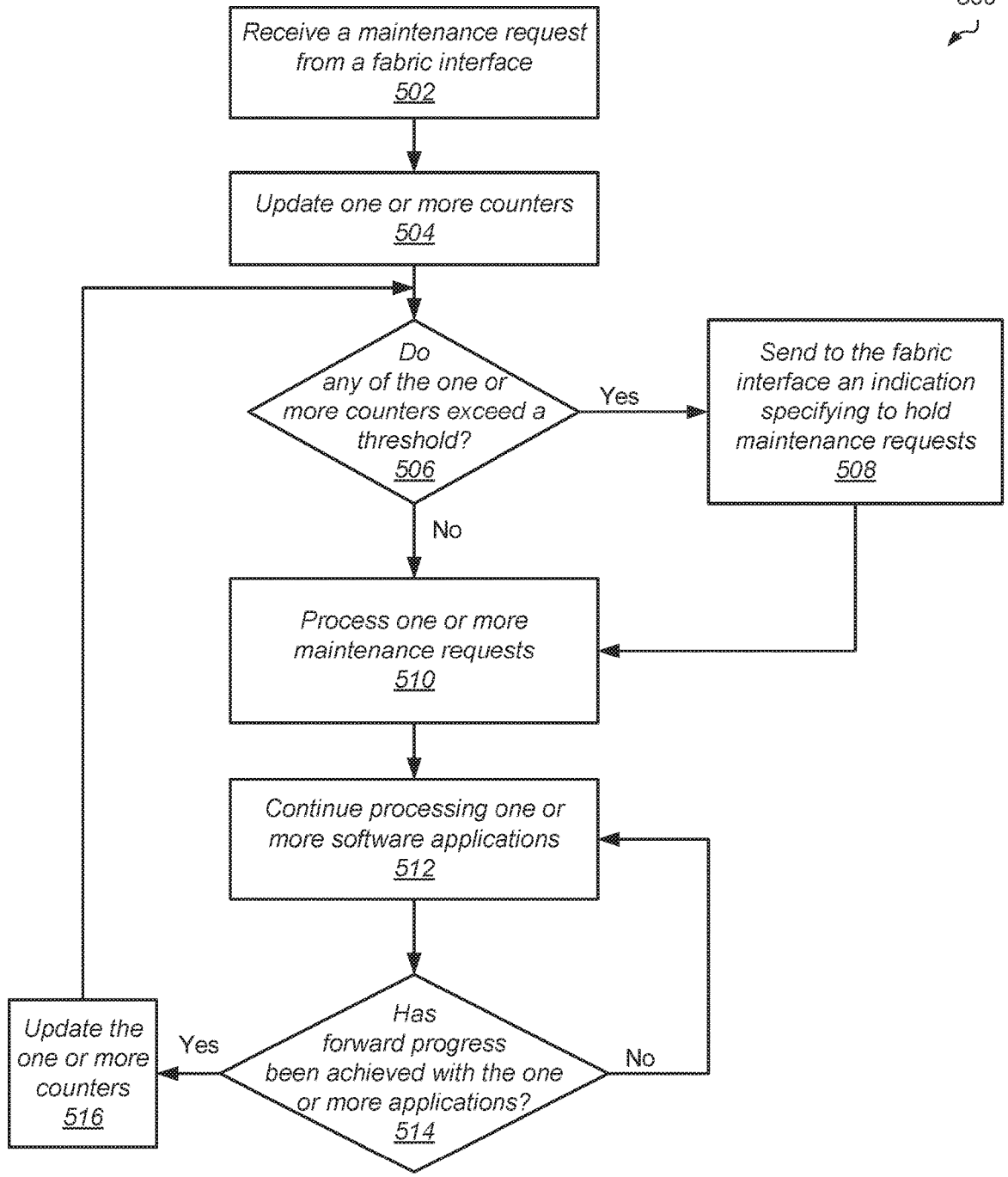
FIG. 5 is a flow diagram of another embodiment of a method for handling maintenance requests among processors in a computing system.

Referring now to FIG. 5, a generalized flow diagram of one embodiment of a method 500 for handling maintenance requests among processors in a computing system is shown. A maintenance request is received from a fabric interface (block 502). One or more counters are updated (block 504). For example, a counter corresponding to a type of the received maintenance request is incremented. Additionally, a counter corresponding to a total number of pending maintenance requests is incremented.

If no counter of the one or more counters exceeds a threshold ("no" branch of the conditional block 506), then one or more maintenance requests are processed (block 510). The processing of the one or more maintenance requests may stall the processing of one or more applications due to blocking accesses to an instruction cache or a TLB. If one or more counters exceed a threshold ("yes" branch of the conditional block 506), then an indication is sent to the fabric interface specifying maintenance requests are to be held (block 508). Afterward, control flow of method 500 moves to block 510 where one or more maintenance requests are processed.

One or more software applications continue processing (block 512). As described earlier, forward progress of the one or more software applications may be measured using a given number of retired operations, a given number of pending non-cacheable requests sent out and a given number of maintenance requests sent out from the given processor. If forward progress has not been achieved with the one or more applications ("no" branch of the conditional block 514), then control flow of method 500 returns to block 512 where one or more software applications continue processing. If forward progress has been achieved with the one or more applications ("yes" branch of the conditional block 514), then one or more counters are updated (block 516). For example, one or more counters are decremented or even reset. Afterward, control flow of method 500 returns to conditional block 506 where the values stored in the one or more counters are compared to thresholds.

Figure 6:
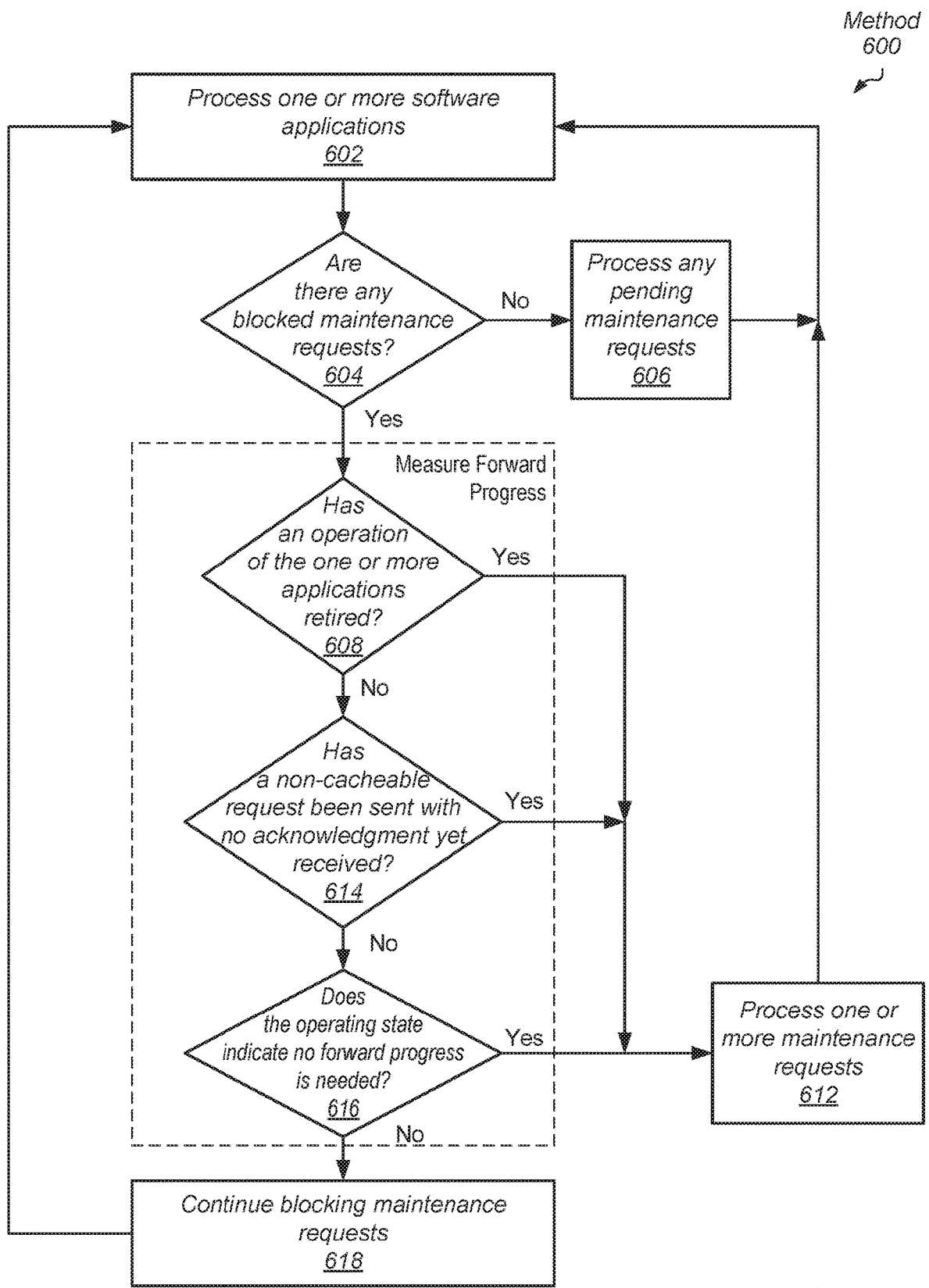
FIG. 6 is a flow diagram of another embodiment of a method for handling maintenance requests among processors in a computing system.

Referring now to FIG. 6, a generalized flow diagram of one embodiment of a method 600 for handling maintenance requests among processors in a computing system is shown. In block 602, program instructions of software applications are processed. The instructions may be compiled, fetched from memory, decoded and executed. If there are maintenance requests that are not blocked ("no" branch of the conditional block 604), then any pending maintenance requests are processed (block 606). Afterward, control flow of method 600 returns to block 602 where program instructions of software applications are processed.

If there are blocked maintenance requests ("yes" branch of the conditional block 604), then it is determined whether forward progress has been achieved with the software applications. If an operation of the one or more applications has retired ("yes" branch of the conditional block 608), then one or more maintenance requests are processed (block 612). One or more applications may stall during the processing of the maintenance requests. Afterward, control flow of method 600 returns to block 602 where instructions of one or more software applications are processed. If an operation of the one or more applications has not retired ("no" branch of the conditional block 608), but a non-cacheable request has been sent with no acknowledgment yet received ("yes" branch of the conditional block 614), then control flow of method 600 moves to block 612 where one or more maintenance requests are processed.

If a non-cacheable request has not been sent ("no" branch of the conditional block 614), then a check is performed to determine whether an operating state indicates no forward progress is needed. An example of an operating state indicating no forward progress is needed is a power-performance state (P-state) indicating a low power (low performance) state such as an idle state or a sleep state. Another example of an operating state indicating no forward progress is needed is a debug state initiated by software or an external hardware debugger. In some embodiments, the front-end of the processor pipeline has been flushed and there is no request to restart instruction fetch. In an embodiment, such a scenario is used as an indication that forward progress is not needed. In some embodiments, a check for whether forward progress is needed is performed before any determination that metrics indicate whether forward progress has been achieved.

If an operating state indicates no forward progress is needed ("yes" branch of the conditional block 616), then control flow of method 600 moves to block 612 where one or more maintenance requests are processed. However, if the operating state indicates forward progress is needed ("no" branch of the conditional block 616), but forward progress has not yet been achieved with the software applications as indicated by the previous conditional blocks 608 and 614, then the maintenance requests continue to be blocked (block 618). Afterward, control flow of method 600 returns to block 602 where program instructions of software applications are processed.

Figure 7:
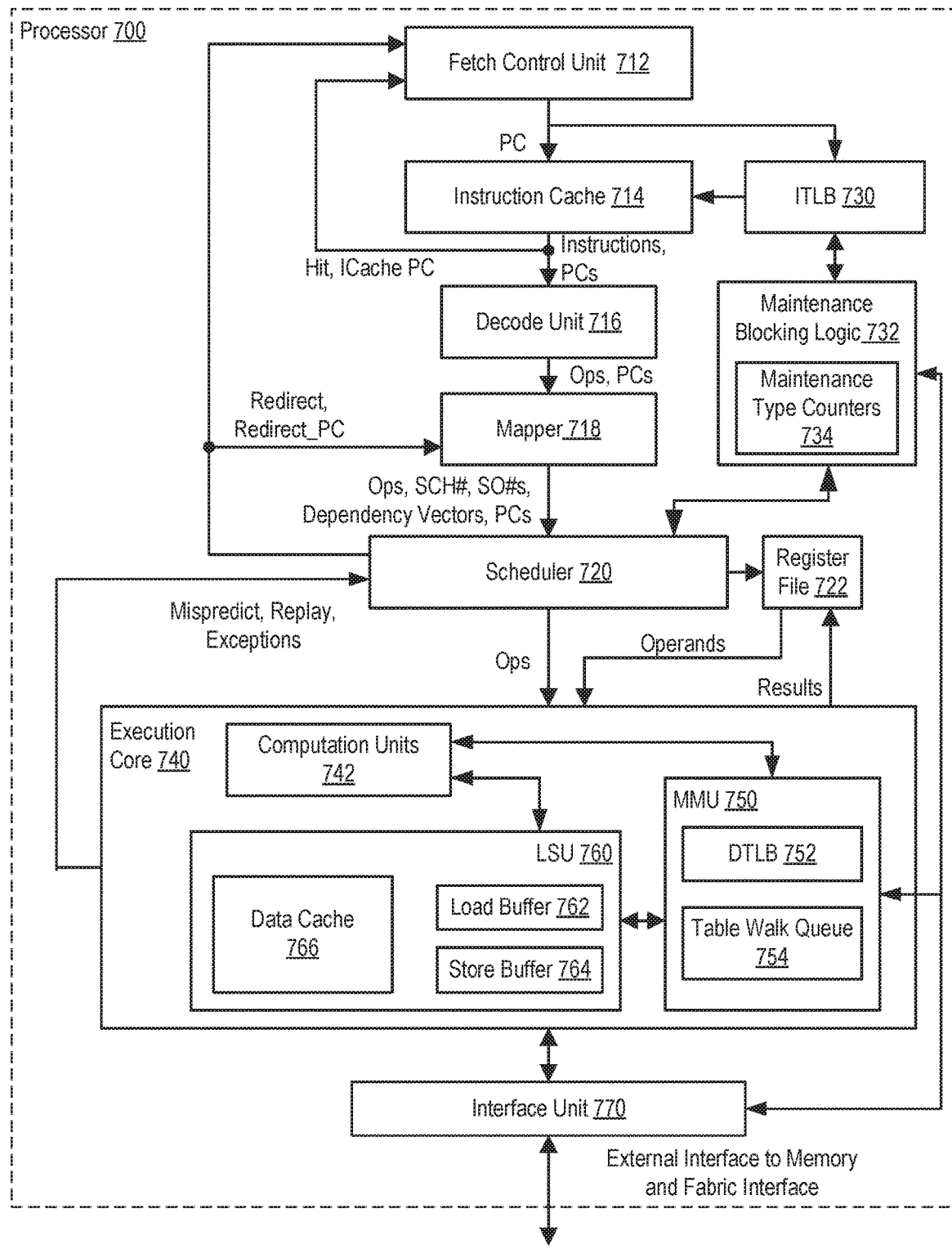
FIG. 7 is a block diagram of one embodiment of a processor.

Referring to FIG. 7, a generalized block diagram illustrating one embodiment of a processor 700 is shown. In the illustrated embodiment, the processor 700 includes a fetch control unit 712, an instruction cache 714, a decode unit 716, a mapper 718, a scheduler 720, a register file 722, an execution core 740, and an interface unit 770. Additionally, processor 700 includes maintenance block logic 732 and maintenance type counters 734. The fetch control unit 712 provides a program counter address (PC) for fetching from the instruction cache 714. In some embodiments, fetch control unit 712 may include one or more types of branch predictors.

The interface unit 770 includes circuitry for interfacing the processor 700 to other devices on the external interface. The external interface may include any type of interconnect (e.g. bus, packet, etc.). The external interface may be an on-chip interconnect, if the processor 700 is integrated with one or more other components (e.g. a system on a chip configuration). In some embodiments, interface unit 770 is an interface to a communication fabric such as a fabric on a system on chip (SoC) component.

The instruction cache 714 may be a cache memory for storing instructions of a given instruction set architecture (ISA) to be executed by the processor 700. The instruction cache 714 may have any capacity and construction (e.g. direct mapped, set associative, fully associative, etc.). The instruction cache 714 may have any cache line size. The instruction cache 714 provides a hit indication and an instruction cache PC to the fetch control unit 712.

In various embodiments, processor 700 implements an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments of processor 700 that employ address translation, the instruction cache 714 may be partially or completely addressed using physical address bits rather than virtual address bits. For example, instruction cache 714 may use virtual address bits for cache indexing and physical address bits for cache tags.

When performing a cache access, in an embodiment, processor 700 stores a set of recent and/or frequently used virtual-to-physical address translations in a translation lookaside buffer (TLB), such as Instruction TLB (ITLB) 730. During operation, ITLB 730 (which may be implemented as a cache, as a content addressable memory (CAM), or using any other suitable circuit structure) may receive virtual address information and determine whether a valid translation is present. If so, ITLB 730 may provide the corresponding physical address bits to instruction cache 714. If not, ITLB 730 may cause the translation to be determined, for example by raising a virtual memory exception.

The instruction cache 714 provides instructions (with PCs) to the decode unit 716, which provides decoded instruction operations (ops, again with PCs) to the mapper 718. In some embodiments, each instruction decodes into one or more instruction operations (ops). The decode unit 716 identifies the type of instruction, source and destination operands, etc., and the decoded instruction operation(s) may include the instruction along with some of the decode information.

The mapper 718 performs register renaming to map source register addresses from the ops to the source operand numbers (SO #s) identifying the renamed source registers. Additionally, the mapper 718 assigns a scheduler entry to store each op, identified by the SCH #, and generates dependency vectors for the op. The mapper 718 provides ops, a scheduler number (SCH #), source operand numbers (SO #s), one or more dependency vectors, and PCs to the scheduler 720. The scheduler 720 receives indications from the execution core 740 specifying replay, mispredict, and exception information. The scheduler 720 provides a redirect indication and redirect PC to the fetch control unit 712 and the mapper 718. Additionally, scheduler 720 provides ops for execution to the execution core 740. The register file 722 provides operands to the execution core 740, and receives results from the execution core 740. The execution core 740 also sends results to the interface unit 770, which transfers traffic with an external interface of the processor 700.

When an op is scheduled, the scheduler 720 reads its source operands from the register file 722 and the source operands are provided to the execution core 740. The register file 722 includes any set of registers usable to store operands and results of ops executed in the processor 700. In some embodiments, the register file 722 may include a set of physical registers and the mapper 718 may be configured to map the logical registers to the physical registers.

The execution core 740 includes computation units 742 for executing received ops according to associated opcodes. Examples of operations to execute include integer and floating-point arithmetic operations and target address calculations. The execution core 740 also includes a memory management unit (MMU) 750 and a load store unit (LSU) 760 for handling memory access operations. The memory access operations may include various types of integer and floating-point load and store operations.

The LSU 760 may include a load buffer 762, a store buffer 764 and a data cache 766. The load buffer 762 may store address information for load operations that have not yet committed. The load buffer 762 may store data information for the load operations when the load buffer 762 receives the data from a data cache, the store buffer 764, or a lower-level memory. The store buffer 764 may store address and data information for store operations that have committed, in order to facilitate load dependency checking.

The data cache 766 may store recently accessed data and one or more page tables with virtual-to-physical address translations. The LSU 760 may include one or more levels of a data cache. For example, the LSU 760 may include a level-one (L1) data cache (not shown) and a L2 data cache 766. A L3 data cache or other lower-level memory may be located off-die. Other combinations for a memory hierarchy are possible and contemplated.

The memory management unit (MMU) 750 may include at least one data translation-lookaside-buffer (DTLB) 752, which stores a recently accessed subset of the one or more page tables. In one embodiment, the execution core 740 includes two or more levels of DTLBs such as a first-level DTLB and a second-level DTLB. In one embodiment, a first-level DTLB may be located in the LSU 760 and a second-level DTLB may be located in the MMU 750. In other embodiments, another number of levels of the DTLB may be used and a location of each one may be within the LSU 760, the MMU 750 or elsewhere within the execution core 740.

In use, each of the ITLB 730 and the DTLB 752 is accessed with a linear address of a corresponding memory access request to determine whether the corresponding TLB contains an associated physical address for a memory location holding requested data. If a mapping is not found within the corresponding TLB, then the address translation is performed by a lookup of the page table in external memory. This lookup process is referred to as a page table walk. The page table walk includes reading the contents of multiple memory locations and using them to compute the associated physical address. After the completed page table walk, the physical address is used to complete an associated memory access request and the linear address to physical address mapping is entered into the corresponding TLB. In various embodiments, the page table walk utilizes an appreciable amount of execution time, multiple accesses of the system memory and associated memory resources such as buses and ports.

In various embodiments, the MMU 750 includes a table walk queue 754. The table walk queue 754 stores requests for a page table walk with each request associated with a respective memory access operation that missed in each available DTLB. In some embodiments, the fetch control unit 712 also includes a corresponding table walk queue for storing requests for a page table walk with each request associated with a respective memory access operation that missed in the ITLB 730. Allocated entries in the one or more table walk queues store an indication that it holds a table walk request.

As shown, processor 700 includes maintenance blocking logic 732. In an embodiment, maintenance blocking logic 732 is located near the decode unit 716. In another embodiment, maintenance blocking logic 732 is located within MMU 750. In some embodiments, processor 700 receives maintenance requests from one or more external processors. In other embodiments, processor 700 is one core of multiple instantiated cores in a processing unit. The external processor or another core within a same processing unit processes instructions by a software application to modify a subset or all of the mappings in a given page table. The external processor sends the maintenance request as a broadcast message to each other processor in the computing system such as processor 700. The maintenance request specifies to processor 700 to invalidate current mappings in the subset or all of the given page table.

In response to receiving the maintenance request from interface unit 770, maintenance blocking logic 732 determines a given type of the received maintenance request. For example, a first type of maintenance request specifies invalidating a subset or all of the current virtual-to-physical mappings stored in ITLB 730. A second type of maintenance request specifies invalidating a subset or all of the current virtual-to-physical mappings stored in DTLB 752. In an embodiment, when the specified mappings are invalidated, processor 700 sends a corresponding acknowledgment via interface 770 to the requesting external processor or core. In another embodiment, prior to when the specified mappings are invalidated, processor 700 sends a corresponding acknowledgment via interface 770 to the requesting external processor or core. In an embodiment, processor 700 later invalidates the specified mappings.

Third type of maintenance request specifies invalidating a subset of instructions stored in instruction cache 714. In an embodiment, when the specified instructions are invalidated, processor 700 sends a corresponding acknowledgment via interface 770 to the requesting external processor or core. In another embodiment, processor 700 sends a corresponding acknowledgment via interface 770 to the requesting external processor or core, and later invalidates the instructions. A fourth type of maintenance request specifies ensuring no older mappings indicated in a previous first type, second type or third type of maintenance request still exists in processor 700. For example, in addition to invalidating particular entries in ITLB 730, DTLB 752 or instruction cache 714, which store the specified mappings, processor 700 ensures pending instructions using the specified older mappings are processed, retired and removed from its pipeline. In another embodiment, processor 700 ensures the pending instructions still using the specified older mappings are flushed from its pipeline since the instructions will be restarted with new mappings at a later time.

When one or more of the decode unit 716 and maintenance blocking logic 732 determines the given type of the received maintenance request, one or more counters in maintenance type counters 734 are updated based on the given type. In an embodiment, the one or more counters in maintenance type counters 734 are incremented. If one or more counters of maintenance counters 734 exceed a threshold, then an indication is sent to interface unit 770 specifying maintenance requests are to be held. For example, maintenance requests received at a later time are stored in a given queue. The received maintenance request is processed. For example, entries in ITLB 730, DTLB 752 or instruction cache 714 are invalidated based on the type of the maintenance request. In another example, pending instructions using older virtual-to-physical mappings are processed and removed or flushed from the pipeline.

The received maintenance request is processed while stalling one or more applications. For example, memory access operations are blocked. Examples of the memory access operations are instruction fetch operations, data load operations and data store operations. Fetch control unit 712 is blocked while entries are invalidated in either the instruction cache 714 or the ITLB 730. The MMU 750 is blocked while entries are invalidated in DTLB 752. If no counter of maintenance counters 734 exceeds a threshold, then no indication is sent to interface unit 770 specifying maintenance requests are to be held. One or more maintenance requests are processed. As described earlier, the processing of the one or more maintenance requests may stall applications such as one or more of fetch control unit 712 and MMU 750 become blocked.

After one or more maintenance requests are processed, one or more software applications continue processing. Forward progress of the one or more software applications may be measured using one or more metrics. As described earlier, a given number of retired operations, a given number of pending non-cacheable requests sent out and a given number of maintenance requests sent out are examples of measured forward progress being achieved. In some embodiments, maintenance blocking logic 732 communicates with at least scheduler 720 and interface unit 770 when determining whether forward progress has been achieved. If forward progress has not been achieved with the one or more applications, then processing of the one or more applications continues. If forward progress has been achieved with the processing of the one or more applications, then one or more counters of maintenance type counters 734 are updated. If forward progress has not been achieved due to processor 700 transitioning into a lower-power P-state, such as a sleep state, then one or more counters of maintenance type counters 734 are updated. In an embodiment, one or more counters of maintenance type counters 734 are decremented. In another embodiment, one or more counters of maintenance type counters 734 are reset.

Figure 8:
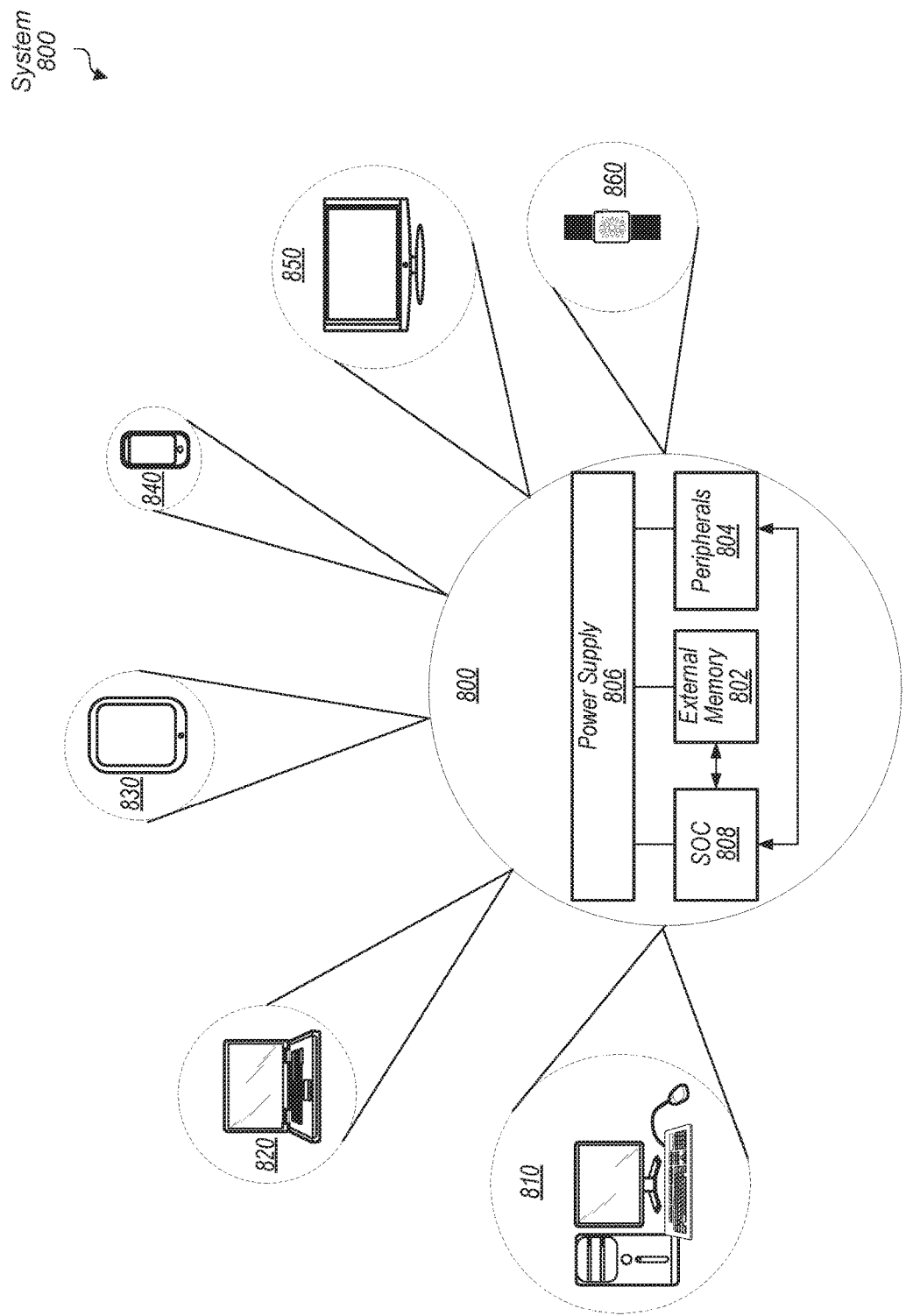
FIG. 8 is a block diagram of one embodiment of a system.

Turning next to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box coupled to a television), wrist watch or other wearable item 860, or otherwise. Other devices are possible and are contemplated. In the illustrated embodiment, the system 800 includes at least one instance of a system on chip (SoC) 808 which includes multiple processors, each with control logic for blocking maintenance requests under qualifying conditions. For example, in some embodiments, multiple processors in SoC 808 includes counters for different types of maintenance requests, control logic for determining when to block maintenance requests and when to proceed again with maintenance requests, and queues for storing pending maintenance requests currently being blocked. SoC 808 is coupled to an external memory 802. In various embodiments, SoC 808 is coupled to external memory 802, peripherals 804, and power supply 806.

A power supply 806 is also provided which supplies the supply voltages to SoC 808 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of SOC 808 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with a SoC or an IC containing processor 100 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as Wi-Fi, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
one or more computation units comprising circuitry configured to process program instructions; and
circuitry configured to:
communicate with a memory and a communication fabric interface;
receive a first maintenance request that comprises a request to modify one or more address translations of a plurality of address translations;
determine a type of the first maintenance request is a first type of maintenance requests; and
based at least in part on a determination that the type of maintenance request is not blocked, send an indication to the one or more computation units to process the received maintenance request; and
based at least in part on a determination that maintenance requests of the first type are blocked:

continue processing, by the one or more computation units, program instructions including memory access instructions of one or more applications; and send an indication to the communication fabric interface specifying that the communication fabric interface hold other received maintenance requests.

2. The processor as recited in claim 1, wherein the control logic circuitry is further configured to increment a count based at least in part on a determination that the first maintenance request is the first type.

3. The processor as recited in claim 2, wherein to determine maintenance requests of the first type are is blocked, the circuitry is further configured to determine the count exceeds a threshold.

4. The processor as recited in claim 2, wherein the circuitry is further configured to, based at least in part on a detection that an indication specifying the one or more computation units have made forward progress is received, reset the count to a value less than the threshold.

5. The processor as recited in claim 4, wherein to determine the one or more computation units have made forward progress, the circuitry is further configured to detect an operation has retired.

6. The processor as recited in claim 4, wherein to determine the one or more computation units have made forward progress, the circuitry is further configured to detect the one or more computation units have sent a non-cacheable request to the communication fabric.

7. The processor as recited in claim 1, wherein the circuitry is further configured to:
receive a second maintenance request that comprises a request to modify one or more address translations of a plurality of address translations;
determine a type of the second maintenance request is a second type of maintenance requests different from the first type of maintenance requests; and
based at least in part on a determination that the second type of maintenance requests are not blocked, send an indication to the one or more computation units to process the second maintenance request.

8. The processor as recited in claim 1, wherein the first type of the first maintenance request is one of:
a request to invalidate one or more entries of a translation lookaside buffer; and
a request to synchronize memory translations for a system including the processor.

9. A method, comprising:
processing, by a plurality of processors, instructions corresponding to one or more software applications;
transferring, by a communication fabric, data between a memory and the plurality of processors;
wherein in response to receiving, via the communication fabric, a first maintenance request that comprises a request to modify one or more address translations of a plurality of address:
determining, by a processor of the plurality of processors, a type of the first maintenance request is a first type of maintenance requests;
in response to determining the maintenance requests of the first type are blocked:
continue processing, by circuitry of one or more computation units of the plurality of processors, program instructions including memory access instructions of one or more applications; and sending, by the control logic in the processor, an indication to a communication fabric interface in the processor specifying that the communication fabric interface hold other received maintenance requests.

10. The method as recited in claim 9, wherein the control logic is further configured to increment a count responsive to determining the first maintenance request is the first type.

11. The method as recited in claim 10, wherein to determine maintenance requests of the first type are blocked, the method further comprising determining the count exceeds a threshold.

12. The method as recited in claim 10, wherein the method further comprises resetting the count to a value less than the threshold responsive to receiving an indication that the one or more computation units have made forward progress.

13. The method as recited in claim 12, wherein making said forward progress comprises retiring an operation.

14. The method as recited in claim 12, wherein making said forward progress comprises sending a non-cacheable request to the communication fabric by the one or more computation units.

15. The method as recited in claim 9, further comprising:
receiving a second maintenance request that comprises a request to modify one or more address translations of a plurality of address translations;
determining a type of the second maintenance request is a second type of maintenance requests different from the first type of maintenance requests; and
responsive to determining the second type of maintenance requests are not blocked, send an indication to the one or more computation units to process the second maintenance request.

16. The method as recited in claim 9, wherein the first type of the first maintenance request is one of:
a request to invalidate one or more entries of a translation lookaside buffer; and
a request to synchronize memory translations for a system including the processor.

17. A computing system comprising:
a memory;
a plurality of processors; and
a communication fabric coupled to each of the plurality of processors and the memory;
wherein in response to receiving, via the communication fabric, a first maintenance request that comprises a request to modify one or more address translations of a plurality of address, a processor of the plurality of processors is configured to:
determine a type of the first maintenance request is a first type of maintenance requests;
in response to determining that the type of maintenance request is not blocked, send an indication to one or more computation units to process the received maintenance request; and
based at least in part on a determination that maintenance requests of the first type are blocked:
continue processing, by circuitry of one or more computation units of the plurality of processors, program instructions including memory access instructions of one or more applications; and
send, an indication to a communication fabric interface specifying that the communication fabric interface hold other received maintenance requests.

18. The computing system as recited in claim 17, wherein the processor is further configured to increment a count based at least in part on a determination that the first maintenance request is the first type.

19. The computing system as recited in claim 18, wherein to determine maintenance requests of the first type are blocked, the processor is further configured to determine the count exceeds a threshold.

20. The computing system as recited in claim 17, wherein the processor is further configured to:
- receive a second maintenance request that comprises a request to modify one or more address translations of a plurality of address translations;
- determine a type of the second maintenance request is a second type of maintenance requests different from the first type of maintenance requests; and
- based at least in part on a determination that the second type of maintenance requests are not blocked, send an indication to the one or more computation units to process the second maintenance request.

\* \* \* \* \*

UNITED STATES PATENT AND TRADEMARK OFFICE
CERTIFICATE OF CORRECTION

PATENT NO. : 11,080,188 B1
APPLICATION NO. : 15/939099
DATED : August 3, 2021
INVENTOR(S) : Tong et al.

Page 1 of 1

It is certified that error appears in the above-identified patent and that said Letters Patent is hereby corrected as shown below:

In the Claims

Column 19, Claim 2, Lines 9-10, please delete "control logic".

Column 19, Claim 3, Line 14, please delete "are is blocked" and substitute -- are blocked --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*